Patented Oct. 7, 1952

2,613,198

UNITED STATES PATENT OFFICE 2,613,198

RESOL-ALKYD RESIN PRODUCT

Herbert Hönel, Hamburg-Wandsbek, Germany, and Heinrich Manzano, Vienna, Austria

No Drawing. Application July 22, 1947, Serial No. 762,788. In Germany March 1, 1941

Section 1, Public Law 690, August 8, 1946
Patent expires March 1, 1961

6 Claims. (Cl. 260—44)

It is known to produce hardenable resinous condensation products by heating resols which are oil insoluble per se for a considerable time with so much mono-alcohols boiling above 80° that at least one molecule mono-alcohol is present per one alcohol-(methylol) group contained therein, and by adding comparatively high oxyfatty-acids or their glycerides simultaneously or afterwards. If the reaction between the resol and the mono-alcohols has been carried out during a sufficiently long time the product may also be combined with fatty oils or neutral resins (e. g. alkyd resins obtained from phthalic acid, castor oil and glycerine). According to the known processes protracted treatment of the resols with the minimum amount of mono-alcohols mentioned is a compulsory condition. The etherification taking place thereby on the one hand causes the compatibility of the modifying substances with the resol, on the other hand, however, also a considerable diminution of the reactivity of the latter.

It has now been found that this disadvantage may be avoided if resols are directly combined with such alkyd resins which contain a considerable portion of free hydroxyl groups in excess; thus the combination of the resol with the plastifying component is the easier effected the larger the number of the free hydroxyl groups is in the latter. Alkyd resins derived from castor oil or its fatty acids, more particularly such in whose production an excess of the esterifying component, i. e. of polyvalent alcohol, has been employed are suitable examples. If the polyvalent alcohol is employed in a sufficiently large excess the co-employment of castor oil or castor oil fatty acid may be dispensed with. Thus, instead of the castor oil or the castor oil fatty acid, also another mono- or poly-basic plastifying acid may be employed for producing the alkyd resin. Alkyd resins carrying primary alcoholic groups, such as may be easily obtained by employing trimethylolpropane, penta-erythrite and the like as esterifying component, are best suited. Thus, according to our invention, resols (phenol poly-alcohols) are combined with condensation products of the polyvalent alcohol-polybasic carbonic acid type which contain a substantial surplus of free, preferably primary, hydroxyl groups, this surplus being sufficiently large to warrant the formation of a clear homogeneous combination product by heating the components. When we employ the term "excess" or "surplus" of free hydroxyl groups, we wish it to be understood that the number of the hydroxyl groups present in the components used as starting material for producing the alkyd resin exceeds that of the carboxyl groups so that an excess of free hydroxyl groups is present in the alkyd resin.

According to the invention resols (phenolpolyalcohols) are to be employed which are derived from phenols having more than two reaction favourable positions in the molecule and which in consequence thereof are very reactive. The combination of the resol with the plastifying alkyd resin is effected in the best manner if the phenols of the kind mentioned carry small aliphatic groups, suitably not more than two C-atoms per phenolic hydroxyl group, dioxydiphenylpropane, dioxydiphenylbutane, m-xylenol or m-ethyl-phenol being examples therefor. Resols in whose production common phenol has been co-employed form coatings which are particularly resistant against mixtures of solvents whereas co-employing a small portion of higher substituted phenols, e. g. butyl-phenol, causes a substantial improvement of the flow of the varnish.

The resol and the alkyd resin are heated together in the presence of an indifferent solvent i. e. one which does not reduce the reactivity of the resol the reaction mixture being suitably stirred and the water present and formed by the reaction is removed diminished pressure being applied in a given case. Heating is suitably not only carried on until the reaction mixture becomes completely clear but continued beyond this point during several hours presumably a partial etherification between the methylol groups of the phenol alcohol and the free hydroxyl groups of the alkyd resin taking place thereby. The etherification is accelerated by the presence of a small portion of substances having an acid action; often the small portion of free phthalic acid or the like mostly present in the alkyd resin is already sufficient. A temperature is applied which lies considerably below that at which the hardening reaction of the resol comparatively quickly reaches the infusible state and the heating is interrupted in time before gelatinisation takes place.

In order to obtain coatings having good adhesiveness and elasticity alkyd resins are employed which show a certain adhesiveness and keep it also then when, heated alone, they are converted into the insoluble rubberlike condition.

The products obtained according to the present process are adapted for producing varnishes, more particularly heat hardening varnishes, or also plastic masses. The hardening is effected in a manner known per se. The films finally obtained are distinguished i. e. by excellent resistance against chemical and mechanical actions.

In accordance with our invention in its preferred embodiment the improved hardenable resins referred to above are produced by combining, with or without the use of a solvent, (1) a hardenable low molecular condensation product comprising essentially phenol alcohols obtained by means of a strong alkaline catalyst from formaldehyde and a phenolic component selected from a group consisting of (a) phenols having more than two reactive positions, (b) mixtures of such phenols, and (c) mixtures of such phenols with up to 10% of phenols having only two reactive positions, said phenolic component having 1⅓ to 2 aliphatic carbon atoms as substituents per phenolic OH group, with (2) a plasticizing alkyd resin containing long aliphatic chains and having alcoholic hydroxyl groups in substantial excess over the amount necessary for completely esterifying the carboxylic groups of the ester-forming components, by protracted heating beyond the point necessary for removal of the water content of the condensation product, in a slightly acid medium at a temperature and for a period insufficient for carrying out the hardening reaction but sufficient for effecting etherification, and interrupting the heating before gelation takes place.

The invention will be more readily understood by reference to the accompanying specific examples, which are intended as illustrative only rather than as limiting the invention to the exact details set forth therein.

*Examples*

(1) An alkyd resin obtained from 100 parts phthalic anhydride, 65 parts glycerine and 120 parts castor oil and a liquid condensation product obtained from each 250 parts p,p'-dioxydiphenyldimethylmethane and formaldehyde (30 p. c.) with the aid of caustic alkali are heated together at about 100°. The water still contained in the condensation product and formed by the reaction is distilled off. The distillation may be supported by co-employing a small quantity of an indifferent solvent, such as toluol or xylol or/and by employing diminished pressure. Heating is continued, whilst stirring, at least until a sample is completely clear in the cold; suitably, however, beyond this point the total heating period being about 8–10 hours. This long treatment increases both the elasticity and the resistance of the heat hardened film particularly against motor fuels and other solvents.

This procedure may also be accelerated by adding a catalytic portion of a strong acid, e. g. about 2–3 parts concentrated hydrochloric acid dissolved in the multiple quantity of alcohol or butanol etc.

After thinning the product by adding further quantities of a solvent a varnish is obtained which after being heat hardened at about 175–180° during about one hour produces a highly elastic very tenaciously adhering film which is distinguished i. e. by very good resistance against motor fuels. The varnish finally obtained shows a much better flow if about 10 p. c. of the quantity of p,p'-dioxydiphenyldimethylmethane mentioned are substituted by p. tert. butyl phenol.

(2) An alkyd resin is produced by heating together 50 parts phthalic anhydride, 50 parts adipic acid, 200 parts synthetic, so called "Vorlauffettsäure," 180 parts penta-erythrite up to 220°. The substance referred to as "Vorlauffettsäure" comprises the fatty acid first runnings obtained by catalytically oxidizing paraffine. The molecular weight averages about 130, corresponding to an acid number of about 430. This resin is heated together in the manner described in Example 1 with a liquid condensation product obtained from each 70 parts phenol, sym. xylenol and diphenylolbutane (produced from phenol and methyl-ethyl-cetone) and 380 parts formaldehyde (30 p. c.) with the aid of alkalies. To the reaction mixture there is added a partial phosphoric-acid-alkyl-ester obtained from 2 parts $P_2O_5$ and 5 parts norm. hexyl-alcohol. The temperature is increased up to 120° and kept until a sample has almost ceased to be sticky.

The product conveniently thinned serves as a varnish which is hardened at 160° for 1 hour a coating of extremely tenacious adhesiveness and high resistance being obtained.

(3) A condensation product obtained from 50 parts p,p'-dioxydiphenyldimethylmethane, 50 parts tricresol and 150 parts formaldehyde (30 p. c.) with the aid of alkalies, and an ester (acid number below 10) obtained by heating to 220°, 100 parts azelaic acid and 80 parts cleaned tri-methylol-propane are mutually interacted in the presence of xylol in the manner described in Example 1 until a sample does not practically show any adhesiveness any more.

After thinning the product in aromatic hydrocarbons to which a small portion of butanol is added a varnish is obtained which is hardened at 170 to 180°. A hardening catalyst of the kind mentioned in Example 2 is suitably co-employed.

We claim:

1. In a process of producing a hardenable resin, the improvement which comprises combining (1) a hardenable low molecular condensation product comprising essentially phenol alcohols obtained by means of a strong alkaline catalyst from formaldehyde and a phenolic component selected from a group consisting of (a) phenols having more than two reactive positions, (b) mixtures of such phenols, and (c) mixtures of such phenols with up to 10% of phenols having only two reactive positions, said phenolic component having 1⅓ to 2 aliphatic carbon atoms as substituents per phenolic OH group, with (2) a plasticizing alkyd resin containing long aliphatic chains and having alcoholic hydroxyl groups in substantial excess over the amount necessary for completely esterifying the carboxylic groups of the ester-forming components, by protracted heating beyond the point necessary for removal of the water content of the condensation product, in a slightly acid medium at a temperature and for a period insufficient for carrying out the hardening reaction but sufficient for effecting etherification, and interrupting the heating before gelation takes place.

2. A process as set forth in claim 1 wherein the phenolic component contains phenols which do not carry aliphatic carbon atoms.

3. A process as set forth in claim 1 wherein the phenolic component contains phenols having only two reactive positions.

4. A process as set forth in claim 2 wherein the phenolic component contains phenols having only two reactive positions and carrying substituents of more than two aliphatic carbon atoms per phenolic OH group.

5. In a process of producing a hardenable resin, the improvement which comprises combining (1) a hardenable low molecular condensation product comprising essentially phenol alcohols obtained by means of a strong alkaline catalyst from formaldehyde and a phenolic component selected from a group consisting of (a) phenols having more than two reactive positions, (b) mixtures of such phenols, and (c) mixtures of such phenols with up to 10% of phenols having only two reactive positions, said phenolic component having 1⅓ to 2 aliphatic carbon atoms as substituents per phenolic OH group, with (2) a plasticizing alkyd resin containing long aliphatic chains and having primary alcoholic hydroxyl groups in substantial excess over the amount necessary for completely esterifying the carboxylic groups of the ester-forming components, by protracted heating beyond the point necessary for removal of the water content of the condensation product, in a slightly acid medium at a temperature and for a period insufficient for carrying out the hardening reaction but sufficient for effecting etherification, and interrupting the heating before gelation takes place.

6. A composition of matter comprising a hardenable resinous condensation product produced in accordance with claim 1.

HERBERT HÖNEL.
HEINRICH MANZANO.

REFERENCES CITED

The following references are of record in the file of this patent:

UNITED STATES PATENTS

| Number | Name | Date |
|---|---|---|
| 1,870,453 | Honel | Aug. 9, 1932 |
| 1,977,652 | Strafford et al. | Oct. 23, 1934 |
| 2,102,617 | Farber | Dec. 21, 1937 |
| 2,144,101 | Butler | Jan. 17, 1939 |
| 2,289,266 | Hansen | July 7, 1942 |
| 2,337,873 | D'Alelio | Dec. 28, 1943 |
| 2,337,874 | D'Alelio | Dec. 28, 1943 |
| 2,338,543 | Rosenblum | Jan. 4, 1944 |
| 2,370,046 | Keyes | Feb. 20, 1945 |

FOREIGN PATENTS

| Number | Country | Date |
|---|---|---|
| 688,268 | Germany | Feb. 16, 1940 |
| 889,799 | France | Jan. 19, 1944 |